United States Patent Office 2,754,287
Patented July 10, 1956

2,754,287

PROCESS FOR THE PREPARATION OF POLYVINYL SULFONAMIDE

Harold F. Park, East Longmeadow, Mass., assignor to Monsanto Chemical Company, St. Louis, Mo., a corporation of Delaware No Drawing. Application March 6, 1953, Serial No. 340,929

6 Claims. (Cl. 260—79.3)

This invention relates to the preparation of homopolymers of vinyl sulfonamide. More particularly, this invention relates to a process for preparing polyvinyl sulfonamide from vinyl sulfonamide whereby a high yield of polymer is obtained.

This application is a continuation-in-part of applicant's copending application S. N. 333,345, filed January 26, 1953, now abandoned.

Monomeric vinyl sulfonamide can be copolymerized with a wide variety of other vinyl monomers by the conventional mass, emulsion, suspension or solution polymerization processes. However, the various processes that can be successfully used in preparing copolymers of vinyl sulfonamide are generally unsuitable for the preparation of homopolymers of vinyl sulfonamide and the results obtained in attempting to prepare homopolymers by such processes are generally unsatisfactory.

Accordingly, an object of the present invention is the provision of homopolymers of vinyl sulfonamide.

Another object is the provision of a process for preparing polyvinyl sulfonamide from vinyl sulfonamide whereby a high yield of polymer is obtained.

These and other objects are attained by polymerizing vinyl sulfonamide in solution in water, a polar organic solvent or a mixture of such solvents while maintaining the solution within the pH range of from about 3.0 to 8.0.

The following examples are given in illustration and are not intended as limitations on the scope of this invention. Where parts are mentioned, they are parts by weight. When polyvinyl sulfonamide is mentioned it is to be understood that a homopolymer of vinyl sulfonamide is being referred to.

EXAMPLE I

Prepare a solution of 50 parts of vinyl sulfonamide in 100 parts of distilled water and heat the solution to reflux in a suitable container fitted with a reflux condenser while maintaining the solution at a pH of about 6.8 through the addition of a suitable MacIlvaine buffer. Slowly add 0.05 part of potassium persulfate dissolved in 5 parts of water over a five hour period with continued refluxing while maintaining the pH of the solution at about 6.8. At the end of this time permit the solution to cool to room temperature. The product is a solution of polyvinyl sulfonamide and vinyl sulfonamide in water. Extract the polymer by evaporating the solution on a steam bath in order to obtain a dry mixture of monomeric and polymeric vinyl sulfonamide. Dissolve the mixture in absolute ethanol and then slowly add benzene to the solution with agitation in order to precipitate the polyvinyl sulfonamide. Recover the precipitated polymer by filtration and dry in an oven at 60° C. The thus-prepared polyvinyl sulfonamide will give a quantitative yield of ammonium chloride when decomposed by being refluxed with a concentrated solution of hydrochloric acid. It is a white-powdery material that softens with charring at temperatures above 200° C. and is insoluble in benzene but soluble in ethanol and dimethyl formamide. A yield of about 90% polyvinyl sulfonamide is obtained by polymerizing vinyl sulfonamide in this manner.

The polymer yield is dependent on the pH of the solution as is shown by the following table which indicates the yield that is obtained when vinyl sulfonamide is polymerized in accordance with the above described procedure at the indicated pH, the percentage of yield being based on the amount of monomer converted to polyvinyl sulfonamide as a result of the polymerization reaction.

Table I

YIELD OBTAINED BY POLYMERIZING 50 PARTS OF VINYL SULFONAMIDE IN SOLUTION IN 100 PARTS OF WATER AT THE INDICATED pH

| pH: | Yield, per cent |
|---|---|
| 3.0 | 35 |
| 5.0 | 65 |
| 6.8 | 90 |
| 7.5 | 45 |
| 8.0 | 15 |
| 10 | Negligible |

EXAMPLE II

Prepare a solution of 5 parts of vinyl sulfonamide in 100 parts of absolute ethanol and place in a suitable container fitted with a reflux condenser and a glass electrode for measuring the pH of the solution. Adjust the pH of the solution to about 7.0 by adding a small amount of the triethanolamine salt of toluene-sulfonic acid if the pH is above 7.0 or by adding a small amount of lithium oleate if the pH of the solution is below 7.0 and then heat to reflux. Continue refluxing for about 5 hours while slowly adding 0.01 part of hydrogen peroxide and while continuously maintaining the pH of the solution at about 7.0 by adding, if needed, either a small amount of the triethanolamine salt of toluene-sulfonic acid or lithium oleate. At the end of this time permit the solution to cool to room temperature and add an equal volume of diethyl ether. The product is a suspension of polyvinyl sulfonamide in the solvent mixture, unpolymerized vinyl sulfonamide remaining in solution. The polymer is recovered by filtration in the form of a white powder that softens with charring at temperatures above 200° C. It is soluble in water and dimethyl formamide and insoluble in benzene. A quantitative yield of ammonium chloride is obtained when the polymer is decomposed by being refluxed with a concentrated solution of hydrochloric acid. About 95% of the vinyl sulfonamide is converted to polyvinyl sulfonamide as a result of this reaction.

The polymer yield is dependent on the pH of the solution as is shown by the following table which indicates the yield that is obtained when vinyl sulfonamide is polymerized in accordance with the above described procedures at the indicated pH, the percentage of yield being based on the amount of monomer converted to polyvinyl sulfonamide as a result of the polymerization reaction.

Table II

YIELD OBTAINED BY POLYMERIZING 5 PARTS OF VINYL SULFONAMIDE IN SOLUTION IN 100 PARTS OF ETHANOL AT THE INDICATED pH

| pH: | Yield, percent |
|---|---|
| 3.0 | 40 |
| 5.0 | 70 |
| 7.0 | 95 |
| 7.5 | 65 |
| 8.0 | 30 |
| 10 | Negligible |

Vinyl sulfonamide has the formula

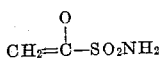

$$CH_2=C-SO_2NH_2$$

It may be prepared by the dehydration of the ammonium salt of vinyl sulfonic acid, as shown in applicant's copending application S. N. 274,513 filed March 1, 1952.

In accordance with the present invention it has been discovered that vinyl sulfonamide will polymerize with an appreciable yield in solution in water, a polar organic solvent or a mixture of such solvents provided that the pH of the solution is within the pH range of from about 3.0 to 8.0. Only a negligible amount of polyvinyl sulfonamide will be formed when vinyl sulfonamide is polymerized in a solution having a pH which is outside the indicated range.

It is necesssary that the vinyl sulfonamide be polymerized in a solution having a pH within the relatively narrow range of from 6.5–7.0 if a yield in excess of 90% is to be obtained. Polyvinyl sulfonamide will be formed with a pH of from about 7.0–8.0 although the yield decreases rapidly as the pH increases. When using an acid pH of from about 3.0–6.5 the yield will diminish as the pH decreases although the rate at which the yield will decrease will not be as rapid as when an alkaline pH is used.

Vinyl sulfonamide is much more soluble in water than in polar organic solvents or in mixtures of water and such organic solvents and it is therefore preferable to use water as the solvent. As shown in Example II, a slightly higher yield of polymer is obtained when a polar organic solvent is used, but the lower yield obtained when water is used as a solvent is more than offset by the ease with which the reaction may be controlled and by the fact that a greater amount of vinyl sulfonamide can be polymerized in a given quantity of solvent. When a polar organic solvent is to be used, it is preferable that it be selected from the group consisting of lower aliphatic alcohols having from 1-4 carbon atoms, vinyl sulfonamide being relatively more soluble in the lower aliphatic alcohols than in other polar organic solvents. However, if desired, other polar organic solvents such as the higher aliphatic alcohols, dioxane, dimethyl formamide, dimethyl sulfone, ethyl carbamate, N-formal morpholine, malonitrile, etc., may be used.

The pH of the solution is most conveniently controlled by using an organic or inorganic buffer which is readily soluble in the particular solvent that is to be used. Generally speaking, the salts of strong acids and weak bases will tend to increase the acidity of a solution while the salts of weak acids and strong bases will tend to increase the alkalinity of a solution. As a result, it is possible to maintain a solution at a desired pH by using an acidic buffer, a basic buffer, or a properly proportioned mixture thereof, depending on the nature of the solvent and the particular pH that is to be used. Illustrative of the buffers that may be used are the MacIlvaine buffers, these buffers being well-known compositions consisting of suitable mixtures of a 0.1 molar aqueous solution of citric acid and a 0.2 molar aqueous solution of disodium phosphate, the relative proportions of the two ingredients determining the pH of the solution. The proportion to be used in maintaining a desired pH may be readily determined from suitable tables such as that set forth on page 1541 of the "Handbook of Chemistry and Physics" (34th edition, 1952–1953 Chemical Rubber Publishing Co., Cleveland, Ohio). Other conventional buffers such as those listed on page 1548 of this book may also be used if desired. Buffers of this nature are primarily useful in maintaining the pH of aqueous solutions and, therefore, when a polar organic solvent is to be used, it is preferable to use other buffers which are relatively more soluble in polar organic solvents. Illustrative of the acidic buffers that may be used when the solvent is a polar organic solvent are the amine or alkyl amine salts of strong organic acids such as para-toluene sulfonic acid, trichloracetic acid, etc., e. g. the amine salt of trichloracetic acid, the triethylamine salt of paratoluene sulfonic acid, etc. Representative of the basic buffers that may be used with a polar organic solvent are the quaternary ammonium or alkali metal salts of weak organic acids such as lauric acid, oleic acid, etc., e. g. lithium oleate, lithium laurate, etc. As a general rule it is desirable to use a mixture of an acidic and basic buffer in the polar organic solvent and when the proportion of a particular acidic and basic buffer to be used for a particular solvent has not been predetermined the proportioning may be controlled by measuring the pH of the solution and then adding such quantities of the acidic and basic buffer as are needed to bring the solution to the desired pH.

The polymerization reaction may be conducted at any temperature from room temperature to about 175° C. When temperatures of from about 50–100° C. are used the reaction goes more smoothly and is easier to control.

The polymerization reaction is preferably accelerated through the use of a polymerization catalyst although polymerization will proceed at a slow rate in the absence of such catalysts. The catalyst should be readily soluble in the solvent for the vinyl sulfonamide and, therefore, it is not possible to use some of the well-known catalysts such as benzoyl peroxide, lauroyl peroxide, di(tertiary butyl) peroxide, etc., which are insoluble in water and polar organic solvents for all practical purposes. Among the catalysts that are soluble in water, polar organic solvents or both are azo compounds, persalts, etc. including the salts of persulfuric acid, perboric acid, peracetic acid, etc. Compounds such as diazodiisopropyl nitrile, sodium perborate, acetyl peroxide, ammonium persulfate, potassium persulfate, hydrogen peroxide, ceric persulfate, etc. are illustrative of the catalysts that may be used. The amount of catalyst may be varied within the limits of from about 0.05–0.5 part of catalyst per 100 parts of monomer. Preferably the catalyst is added slowly to the solution during the entire course of the polymerization reaction. In order to do this conveniently the catalyst is added until an increase in the viscosity of the solution can no longer be detected, this being an indication that the reaction has gone to completion.

If desired, other conventional modifiers such as redox agents, chain-transfer agents, etc. may be added to the solution to regulate molecular weight and direct the course of the reaction.

The polyvinyl sulfonamide prepared in this fashion may be reacted with formaldehyde to form methylol derivatives or may be reacted with concentrated sodium hydroxide to form the sodium salt of polyvinyl sulfonamide. Polyvinyl sulfonamide may be compounded with conventional ingredients such as solvents, diluents, fillers, colorants, plasticizers, etc., in order to prepare compositions having a wide variety of physical properties and suitable for many uses such as, for example, the preparation of synthetic fibers, molding powders, soil additives, adhesives, coatings, etc.

What is claimed is:

1. A process which comprises polymerizing vinyl sulfonamide in solution in a solvent taken from the group consisting of water and polar organic solvents at a temperature of about 50–100° C. and a pH of 6.5–7.0 in the presence of a catalytic amount of a solvent soluble free radical generating polymerization catalyst.

2. A process as in claim 1 wherein the pH of said solution is maintained through the addition thereto of a pH regulator.

3. A process as in claim 1 wherein the solvent is water.

4. A process as in claim 1 wherein the solvent is a polar organic solvent.

5. A process as in claim 4 wherein the polar organic solvent is an aliphatic alcohol having 1–4 carbon atoms.

6. A process as in claim 5 wherein the aliphatic alcohol is ethanol.

References Cited in the file of this patent

UNITED STATES PATENTS

| | | |
|---|---|---|
| 2,324,896 | Zerweck | July 20, 1943 |
| 2,615,000 | Bradley | Oct. 21, 1952 |

FOREIGN PATENTS

| | | |
|---|---|---|
| 623,422 | Great Britain | May 17, 1949 |